Dec. 13, 1938.   J. H. DE BOER ET AL   2,139,731
ASYMMETRIC ELECTRODE SYSTEM
Filed May 23, 1936
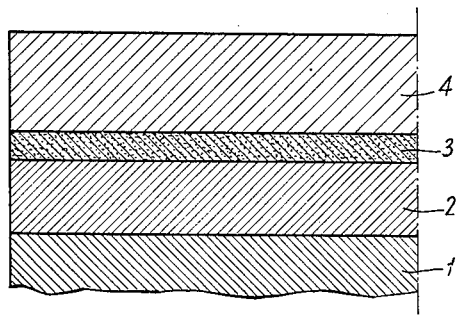
INVENTOR
JAN HENDRIK DE BOER AND
WILLEM CHRISTIAAN VAN GEEL
BY
Charles McClair
ATTORNEY Patented Dec. 13, 1938

2,139,731

UNITED STATES PATENT OFFICE 2,139,731

ASYMMETRIC ELECTRODE SYSTEM

Jan Hendrik de Boer and Willem Christiaan van Geel, Eindhoven, Netherlands, assignors to N. V. Philips Gloeilampenfabrieken, Eindhoven, Netherlands Application May 23, 1936, Serial No. 81,464
In Germany June 1, 1935

7 Claims. (Cl. 175—366)

This invention relates to an electrode system having asymmetrical conductivity and more particularly to a dry rectifier or photo-electric cell.

In the conventional form of rectifier or photo-electric cell provided with a pair of electrodes, there is sometimes placed between the electrodes a separate insulating coating which is arranged or formed independently of the electrode material and consists of a material which is applied in the liquid or solid state onto one of the electrodes or which softens at an increased temperature (100 to 200° C.)

Materials possessing the above properties have been proposed which are very suitable for making insulating coatings. This group of materials includes, for example, artificial resins such as the condensation products of urea and formaldehyde or of phenols and formaldehydes, polyvinyl acetate, polystyrene and polymerized acryl derivatives. When used as a material for insulating coatings they offer the following advantages: low dielectric losses, a high disruptive strength owing to the property that they have a very high insulation value, and furthermore they firmly adhere to the adjoining surfaces of the adjacent electrodes. Particularly polystyrene is possessed of favorable properties when used as a material for insulating coatings.

These materials have the less favorable property of softening at a temperature of something less than 200° C. Such temperatures may occur when selenium is used for the semi-conductive electrode of the system, since this material, after the insulating coating has been applied, is heated up to a temperature of about 200° C. in order that it may pass into the conductive crystalline modification. In this case the insulating coating will soften, so that not only differences in strength, but also the risk of perforation of the insulating coating and a short-circuit of the electrodes may occur. This risk may also occur when applying the insulating coating from a solution, for example, when the system is put together before the solvent has been completely removed.

The principal object of our invention is to provide an improved asymmetric electrode system.

According to the invention the objections referred to above are voided by adding to the insulating coating material a solid insulating material for giving it a greater mechanical strength. In this way a structure preventing the above defects is formed inside the insulating coating.

A solid material increasing the mechanical strength is to be understood to mean in this case a material which does not dissolve in the used solvent or has a higher softening point than the insulating coating material proper.

It has been found that mica powder is a very suitable material to add to the insulating coating material. Instead of mica powder it is also possible to use quartz or aluminum oxide powder, for example. Furthermore paper soaked in artificial resin, like condenser paper, provides excellent results. These materials are not detrimental to the dielectric properties of artificial resin, since they have the property of being themselves capable of forming a dielectric.

A further example of an insulating coating according to the invention is paper impregnated with molten sulphur, or shellac mixed with mica-powder. It has also been found that an excellent insulating coating is obtained when making it from polystyrene to which fine mica-powder is added.

The novel features which we believe to be characteristic of our invention are set forth with particularity in the appended claims, but the invention itself will best be understood by reference to the following description taken in connection with the accompanying drawing in which the figure in the drawing is an enlarged sectional view of an asymmetric electrode system made in accordance with our invention.

In one form of our invention an amorphous selenium layer of some hundredths to some tenths of a millimeter is applied in the liquid state on a metal support consisting, for example, of brass, iron, copper or aluminum, this layer being either smoothly rolled or smoothened with the aid of a hot smoothing iron and after that the insulating coating is provided on the selenium surface.

The selenium electrode is dipped into a solution of polystyrene in a rapidly evaporating solvent, such as benzene, containing finely divided mica powder and is more or less rapidly drawn out of the bath in accordance with the desired thickness of the insulating coating, which depends on the voltage to be blocked and varies between 0.1 to 10 microns. The solvent evaporates immediately, whereas the insulating coating, which consists of polystyrene and contains a skeleton or base of mica powder in order to ensure a greater mechanical rigidity remains behind on the electrode and adheres to it.

After that the selenium electrode is introduced into a furnace and kept for a comparatively long time (2 to 24 hours) at a temperature of about 200° C., at any rate at a temperature below the melting point of selenium. In this case this treatment has a threefold purpose, viz.: (a) the selenium is converted from the amorphous state into the conductive crystalline modification; (b) any benzene particles which may remain behind on the electrode and are detrimental to the mechanical properties of the insulating coating material are completely removed by vaporization, and (c) the polystyrene is further thoroughly polymerized, thus improving its favorable properties as a material for insulating coatings.

Generally it is also possible to apply the insulating coating after heating the selenium for conversion into the conductive crystalline modification. In this case it is desirable to repeat the heating operation at about 200° C.

After that the counter-electrode consisting of a highly conductive metal or alloy having a high electron emitting capacity is applied on the insulating coating. The counter-electrode may be effected by means of the well-known spraying method and using Wood's metal, for example, in the liquid state.

The construction of the electrode system may also be effected in the reverse order, so that the insulating coating is applied onto the counter-electrode. In the manufacture of photo-electric cells this may be effected as follows. For the counter-electrode a good conducting material is used which, however, should be transparent. For this purpose it must have a very small thickness, so that the counter-electrode requires a support which preferably consists of glass. After that the insulating coating of polystyrene containing mica is applied onto this counter-electrode, which may consist of silver precipitated on the glass from the vapor phase, whereupon the semi-conductive (electro-negative) electrode, if desired together with the support, is attached to said coating. The adherence of the polystyrene layer both to the electro-positive and to the electro-negative electrode is helped by heating the insulating coating to a high temperature, so that it becomes a little softer.

The invention will be more clearly understood by reference to the accompanying drawing representing, by way of example, one embodiment thereof.

The support consisting of a metal base 1 serves at the same time to establish an electrical connection to the selenium electrode 2. The selenium carries the layer of polystyrene 3 which has a skeleton or base indicated in dotted lines and consisting of mica particles. The counter-electrode 4 of Wood's metal is positioned over the insulating layer 3.

While we have indicated the preferred embodiments of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

What we claim as new is:

1. An asymmetrical electrode system, comprising a plurality of metal electrodes, a layer of selenium and an insulating coating of artificial resin between the electrodes, said coating containing solid insulating materials.

2. An asymmetrical electrode system, comprising a plurality of metal electrodes, a layer of selenium and an insulating coating between the electrodes and comprising polystyrene which is applied in the liquid state and contains powdered mica.

3. An asymmetrical electrode system comprising a plurality of metal electrodes, a layer of selenium and an insulating coating between the electrodes and comprising artificial resin which softens at a temperature around 200° C. and contains solid insulating materials.

4. An asymmetrical electrode system comprising a plurality of metal electrodes, a layer of selenium and an insulating coating between the electrodes and including material containing powdered mica.

5. An asymmetrical electrode system comprising a plurality of metal electrodes, a layer of selenium and an insulating coating between the electrodes and including a material containing quartz powder.

6. An asymmetrical electrode system comprising a plurality of metal electrodes, a layer of selenium and an insulating coating between the electrodes, said coating including polystyrene containing mica powder.

7. An asymmetrical electrode system comprising a plurality of metal electrodes, a layer of selenium and an insulating coating between the electrodes, said coating consisting of paper impregnated with polystyrene.

JAN HENDRIK de BOER.
WILLEM CHRISTIAAN van GEEL.